Figures 1, 2, 3, 4:
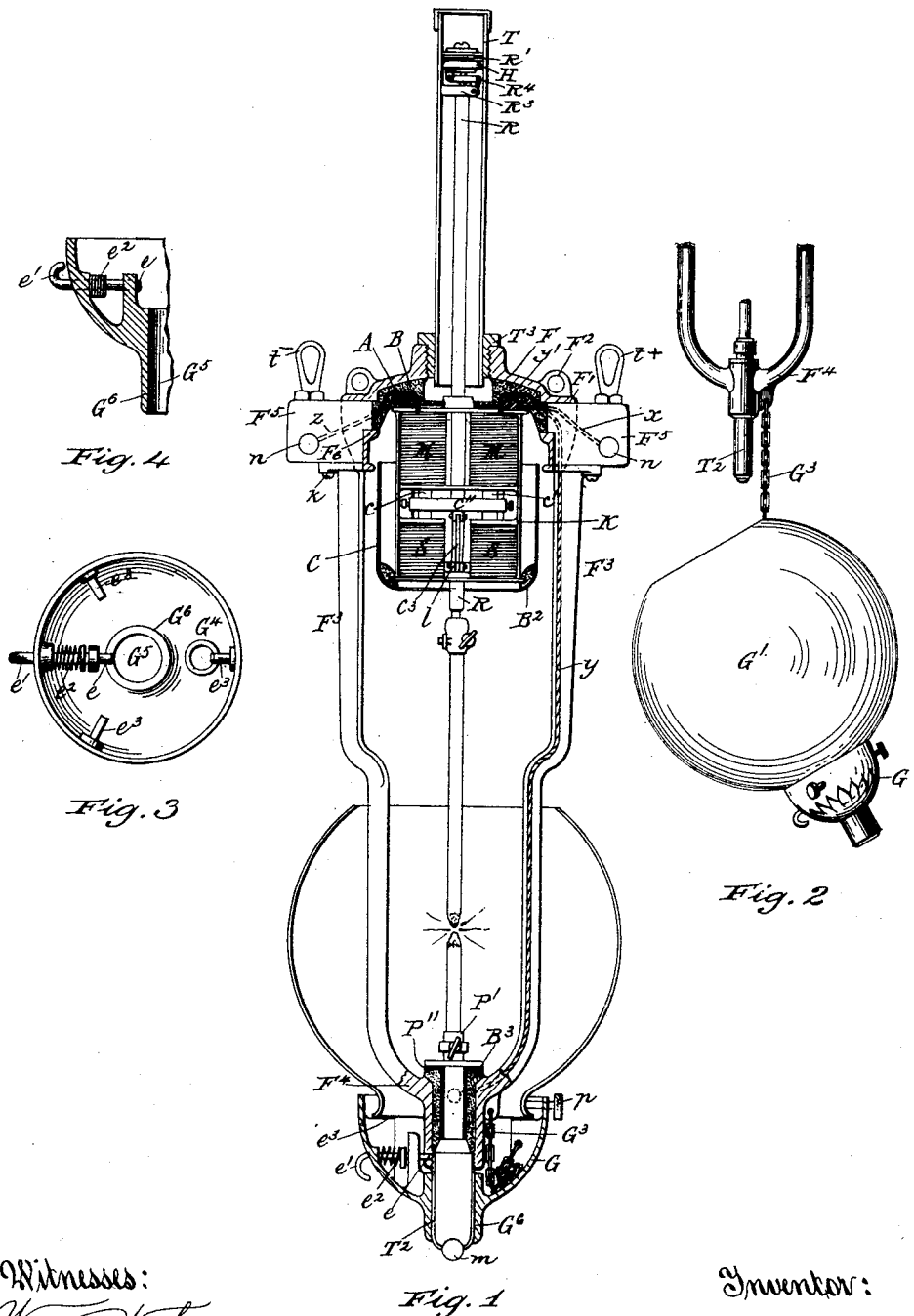

(No Model.) 3 Sheets—Sheet 1.

A. G. WATERHOUSE.
ELECTRIC ARC LAMP.

No. 464,682. Patented Dec. 8, 1891.

Witnesses:
Walter W. Lovegrove
Frank G. Waterhouse

Inventor:
Addison G. Waterhouse (No Model.) 3 Sheets—Sheet 2.
A. G. WATERHOUSE.
ELECTRIC ARC LAMP.
No. 464,682. Patented Dec. 8, 1891.
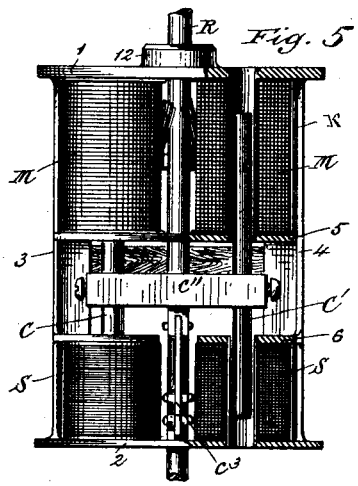
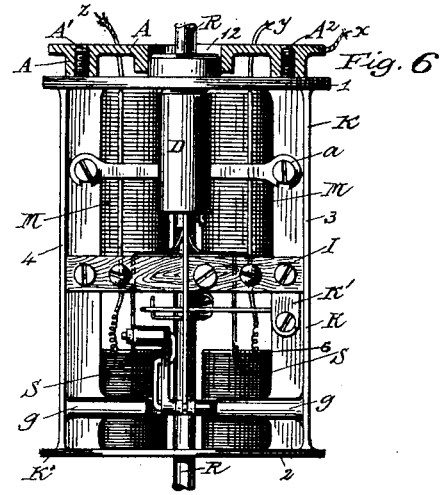
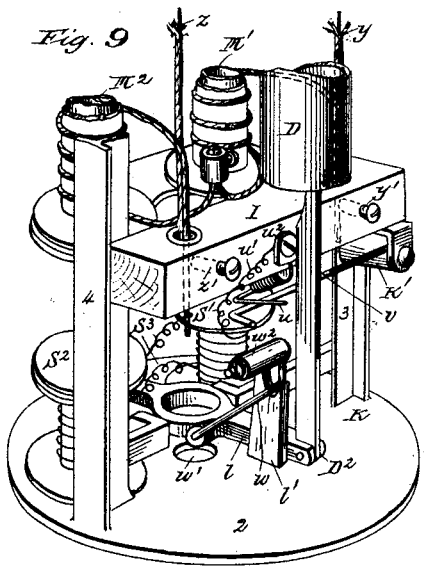
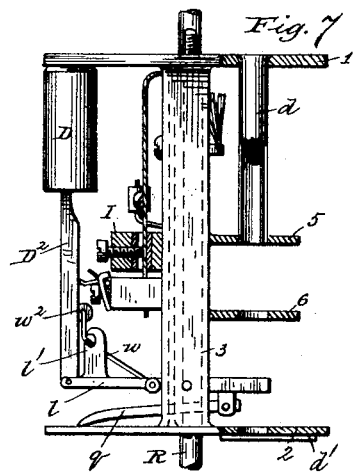
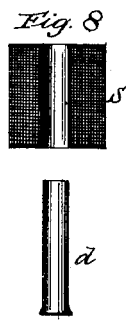
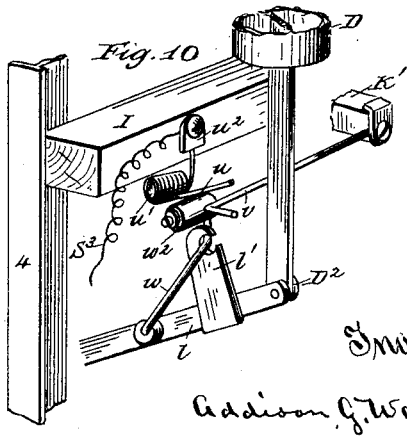
Witnesses:
Walter W. Lovegrove
Frank G. Waterhouse
Inventor:
Addison G. Waterhouse (No Model.) 3 Sheets—Sheet 3.
A. G. WATERHOUSE.
ELECTRIC ARC LAMP.
No. 464,682. Patented Dec. 8, 1891.
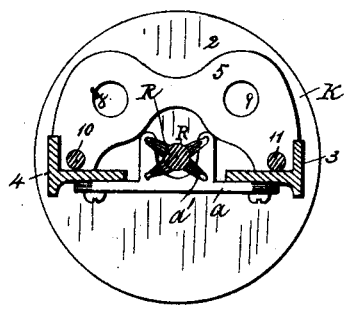
Fig. 11
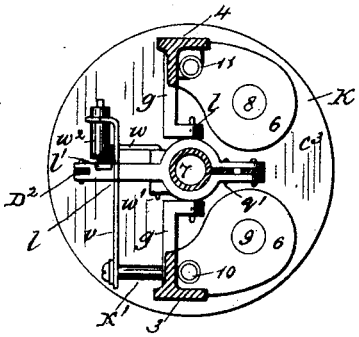
Fig. 12
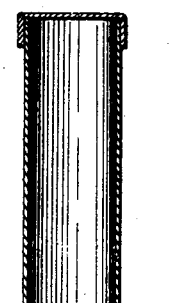
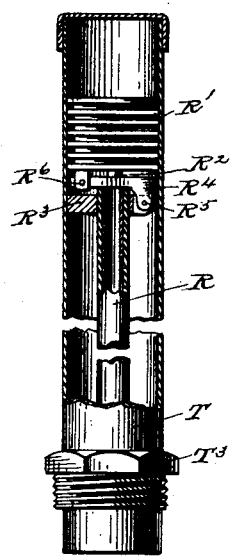
Fig. 13
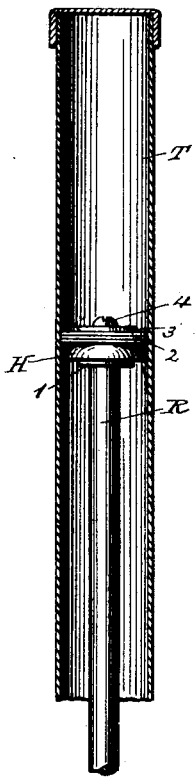
Fig. 14
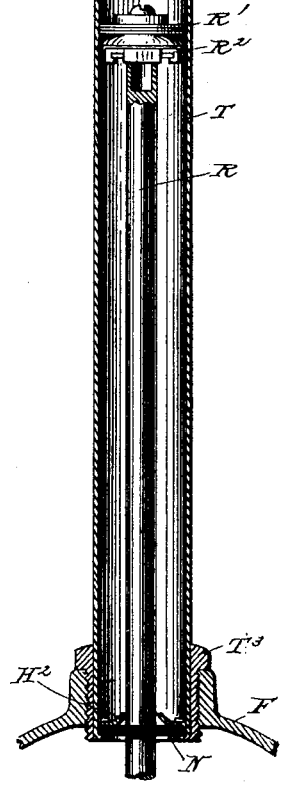
Fig. 15
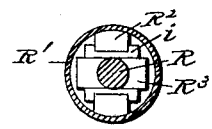
Fig. 16
Witnesses:
Walter W. Lovegrove
Frank G. Waterhouse
Inventor:
Addison G. Waterhouse

UNITED STATES PATENT OFFICE.

ADDISON G. WATERHOUSE, OF HARTFORD, CONNECTICUT.

ELECTRIC-ARC LAMP.

SPECIFICATION forming part of Letters Patent No. 464,682, dated December 8, 1891.

Application filed April 1, 1891. Serial No. 387,317. (No model.)

*To all whom it may concern:*

Be it known that I, ADDISON G. WATERHOUSE, a citizen of the United States, and a resident of the city of Hartford, State of Connecticut, have invented certain new and useful Improvements in Electric-Arc Lamps, of which the following is a specification.

My invention relates to electric-arc lamps and is designed to simplify the construction and operation of the same, and includes improvements, first, in a weather-proof lamp-frame; second, in the way of constructing the lamp so that its parts can be joined together and insulated by means of cement; third, in its general form, with a view of simplifying its construction; fourth, in the way of constructing and joining its electro-magnets and controlling mechanism; fifth, in its automatic shunt-circuit breaker; sixth, in the means of producing a slow and even feed to the upper carbon, and, seventh, in several accessory and equivalent devices.

The various parts of my invention will be described in connection with the accompanying drawings, and more particularly pointed out in the claims.

As my invention covers several distinct features in an electric-arc lamp, I will describe them in the order in which they are arranged in the drawings, and more particularly point them out in the claims.

Figure 1 shows a side sectional elevation of the lamp, showing most of its accessory parts. Figs. 2, 3, and 4 are details of the lamp-frame and globe-holder. Figs. 5, 6, and 7 show elevations from different sides of the insulated cage containing the electro-magnets and regulating mechanism of the lamp. Fig. 8 is a detail. Figs. 9 and 10 show sections of the regulating mechanism of the lamp and its automatic shunt-circuit breaker. Figs. 11 and 12 are plans of the cage. Figs. 13, 14, 15, and 16 show means of retarding the downward motion of the carbon-rod.

Referring to Fig. 1, showing a side and partial sectional elevation of a complete lamp, the frame of this lamp consists of the top tube T, a top F, shaped in the form of an inverted cup. This top has hanging eyes $F^2$, side lugs or sockets $F'$, adapted for receiving and sheltering the insulators $F^5$, to which the lamp-terminals $t + t -$ are secured by means of the nuts $n$ and $n$. From these nuts the conductors $x$ and $z$ pass into the mechanism of the lamp. The side bars of the lamp-frame $F^3$ are cast to and made a part of the top F, and extend downward to the sockets $F'$ and unite at the bottom in forming the lower base $F^4$, which has an annular recess in which a shell $P''$, adapted for holding the lower-carbon holder $P'$, is rigidly secured by the insulating-cement $B^3$.

In the lower part of the base $F^4$ is screwed a tail-tube $T^2$, which tube $T^2$ is adapted for receiving the globe-holder G. This globe-holder is made in a semispherical form, with a shell $G^6$, having an annular opening, which adapts it for sliding or fitting around the tube $T^2$. The upper end of the shell $G^6$ forms a hub inside the globe-holder G, which leaves an annular recess inside of the globe-holder and outside of the hub formed by $G^6$, this recess to be used for holding the chain $G^3$. One end of said chain is connected to the lower lamp-frame $F^4$ and the other end to the globe-holder G. The object of the chain is for suspending the globe-holder G and its globe $G'$ to the lamp-frame while the lamp is being trimmed, as shown in Fig. 2. The globe-holder is secured to the lamp-frame by means of a sliding bolt $e$, which enters a recess in the lower part of the lamp-frame $F^4$. This bolt has bearings inside of the globe-holder G and is provided with a spring $e^2$, which forces the bolt $e$ into the lamp-frame and holds the globe-holder in its place. The outer end of the bolt $e$ is provided with a hook $e'$, which is adapted for drawing the bolt out from the frame $F^4$ by turning the hook upward, so its point will cam on the outer surface of the globe-holder, as shown in Fig. 4.

Fig. 3 is a plan of the globe-holder G, showing three internal ribs $e^3$, also the bolt $e$, its spring $e^2$, and its hook $e'$, also showing the internal hub of $G^6$, with its central opening $G^5$, adapted for receiving the tail-rod $T^2$. $G^4$ shows a ring connected to one of the ribs $e^3$. This ring is for receiving one end of the chain $G^3$, as shown in Figs. 1 and 2.

In Fig. 1 is also shown the weather-proof shield C, which with F completely incloses the regulating mechanism of the lamp by fitting inside of F at the top. The bottom of C is lined with an insulating-ring $B^2$, which forms a weather-proof joint around the said mechanism and the shield C.

The parts of the lamp-frame consisting of the top F, side bars $F^3$, and lower frame $F^4$ are all cast in one piece.

The top tube T and the lower tube $T^2$ are screwed into the lamp-frame. These tubes and the lamp-frame are insulated from the parts of the lamp carrying the current.

The parts connected to the lamp-frame, but electrically insulated therefrom, are the anchor-plate A, to which the cage K, containing the controlling mechanism, is attached. This anchor-plate A is secured in the bell F of the lamp-frame by means of an insulating-cement B, which surrounds the anchor-plate A and also fits in the upper part of the bell F, so that A and the cement B become a part of the lamp-frame. The insulating-cement is further secured in its place by lugs and annular beads or ribs $F^6$, such as shown cast in the interior of bell F.

The anchor-plate A is constructed so that its edges will present a series of points and angles to enable the cement B, in which it is embedded, to cling to it, and its under surface has four lugs which extend out through the cement and form a seat or bearing for the cage K. Two or more of these lugs are provided with screw-holes, into which the screws $A'$ and $A^2$ enter and secure the cage K to the anchor A, as shown in Fig. 6. The wire $x$ enters from one of the lamp terminals, passing through the cement and is secured to plate A. The wires $y'$ and $z$ pass through the spokes of plate A without touching it and are secured in their place by the cement B, which holds A in place; also the wires $x$, $y$, and $z$, binding them all together and making them fixed and rigid parts of the lamp-frame.

As before stated, the shell $P''$ is insulated from the lamp-frame by means of the cement $B^3$, which intervenes between the central shell of $P''$ and the inner surface of $F^4$. This cement extends up from $F^4$, forming a hub which is capped by the top flange of $P''$. This flange has a bead extending around its under edge, which holds that part of the cement extending above the lamp-frame $F^4$ from cracking or spreading. The advantage of joining these electrodes A and $P''$ to the frame by means of a cement which can be used while in a soft state is that it forms a perfect fit between and around the articles to be joined together, and thereby does away with the expense of finishing or fitting the two parts together with the insulation required between them, and the great value in the case of joining the anchor A in the bell top F of the frame by the means shown is that it avoids the necessity of making any screw-holes or placing any screws through the bell top F, thereby avoiding any leak from outside sources and keeping the electrical conductors or current away from the top of the lamp, where rain or moisture will lodge and be liable to short-circuit the parts which would extend up through the frame.

The electrical connections which are fixed to the lamp are, first, the positive terminal $t+$, secured into a nut $n$, fixed in a wooden arm $F^5$, from which nut $n$ a wire $x$ runs to the anchor-plate A, through which the current passes to the cage K and carbon-rod R, then through the carbons to the lower-carbon holder $P'$ in base $F^4$, then out through the side wire $y$, which is connected to the shell $P''$ in the base $F^4$ and lashed on one of the side bars $F^3$ of the frame, then into the bell F and through the cement B by way of wire $y'$, then to the two electro-magnets M, which are connected in series and insulated from the cage K by means of the paper spools upon which their wire is wound, then out through wire $z$ to a nut $n$, then to the negative terminal $t-$, which is fixed on the other wooden arm $F^5$.

I will now refer to Figs. 5, 6, and 7, showing various elevations of what I call the "cage" K, consisting of a brass or non-magnetic frame for holding the electro-magnet coils and all parts belonging to the regulating mechanism.

The cage K is a rectangular frame, having top and bottom formed by circular disks, and consists of the top 1, bottom 2, side bars 3 and 4, and magnet-floors 5 and 6, all cast in one piece. Fig. 7 shows a side elevation showing one of the side bars 3, the top 1, bottom 2, upper magnet-floor 5, and lower magnet-floor 6. In constructing these cages (see Figs. 11 and 12) I have a central hole 7 for the carbon-rod, and holes 8 and 9 for the electro-magnets, and holes 10 and 11 for bolts to pass through for bolting the cage to the anchor-plate A. After the holes are bored the magnet-coils M M and S S, as shown by S in Fig. 8, are slid in between the floor 6 and bottom 2. Then tube $d$ is passed up through bottom 2, through coils S and floor 6, where it is held in place by the plate $d'$, which covers the holes. In this way all the four magnet-coils are inserted in their respective places. The tubes $d$ perform the double purpose of keeping the coils in their place and acting as guides for the moving or controlling armature, composed of the iron rods $c$ and $c'$, which are connected by the iron yoke $c^2$. (See Fig. 5.) Connected to $c'$ is the link $c^3$, through which the movement of the armature is imparted to the lever $l$, the clutch $q$, and carbon-rod R. (See Fig. 7.) Before leaving this subject of electro-magnets it is well to state that the upper coils M M are the main-circuit coils, used for producing and maintaining a separation of the carbons, and the lower coils S S are shunt or derived circuit coils around the arc, used for producing a downward feed of the upper carbon. All these coils are wound on insulating-spools, which completely insulate the wire forming the coils from the cage K. One of the advantages of securing the electro-magnet coils in this way is the exact alignment secured for the tubes $d$, in which the armature works. Of course, a single magnet instead of double magnets can be made the same way.

Fig. 5 shows an elevation of the cage K, with the coils on one side cut away, showing the armature $c'$ and floors 5 and 6.

Fig. 6 shows an opposite elevation of the cage K, showing part of the contact-piece $a$, dash-pot D, and insulating-block I, attached to the sides 3 and 4 of the cage. The arms $g$ are extensions from the side bars 3 and 4, which form bearings into which the clutch-lever $l$ is pivoted, as better shown in plan view, Fig. 12. A plan of the contact-piece $a$ is shown in Fig. 11, showing the two ends of $a$ screwed to the side bars 3 and 4, and provided with four contact-brushes $a'$, which slant upward and press against the carbon-rod R.

Fig. 12 shows a sectional plan of the side bars 3 and 4; also, two lower floors 6 6 for the magnet-coils S S; also, holes 10 and 11, through which the bolts $A'$ and $A^2$ screw the cage to the anchor-plate A, as shown in Fig. 6; also, the arms $g$, upon which the lever $l$ is pivoted, to which is connected the rod $D^2$ of the dash-pot; also, the pin $c^3$, belonging to the link of the armature-yoke $c^2$ and which works the lever, and the pin $q'$, to which is hung the clutch $q$, which engages with and supports the carbon-rod R. There is also connected to lever $l$ part of a cut-out device consisting of a swinging wire $w$, hinged in the lever $l$ at $w'$. This wire loosely passes through a hole in an upright arm $l'$, made a part of lever $l$. On the end of wire $w$ is fixed a roller $w^2$, which strikes against a spring $v$, secured to a lug $K'$, made a part of cage K.

A complete description of the shunt cut-out or circuit-breaker, together with a description of the circuits forming the electro-magnets of the lamps, is as follows, reference being had to Figs. 9 and 10. Fig. 9 shows a section of part of the cage K, showing the part of the mechanism belonging to the automatic shunt-circuit breaker and also the routes of the two circuits through the lamp. The main-current circuit first passes to the cage K, as before described. Then it passes down the upper carbon through the arc to the lower carbon, then up the side wire $y$, one end of $y$ being shown in Fig. 9, which is where the current enters. $y$ leads to the terminal $y'$, fixed in the insulating-block I. Then it leads from $y'$ and through conductors which form the main magnet-coils $M'$ $M^2$. These coils are insulated from the cage K. Then it leads to terminal $z'$ in block I, then out on wire $z$ to the negative lamp terminal. The shunt-circuit begins at the cage K, which is charged with the main circuit just before it passes to the arc. The shunt-circuit passes out on lug $K'$ to the snap-wire $v$, then to the spring $u$, which normally remains in contact with $v$, then through $u$ to the screw $u^2$, placed in the insulating-block I, then out on the shunt-wire (shown in curled form) to shunt magnet-coil $S'$, then across on wire $S^3$ to shunt-coil $S^2$, then to the end of wire $z$, which is connected to the terminal $z'$ in block I, which leads out of the lamp to its negative terminal. It will be seen that as the shunt-circuit crosses from wire $v$ to spring $u$ by separating $v$ and $u$ the shunt-circuit would be broken.

The automatic shunt-circuit breaker performs the following duties: First, it keeps the shunt-circuit complete while the lamp is working in a proper condition; second, it breaks the shunt-circuit in case the main circuit breaks or the resistance of the lamp becomes so great as to endanger the shunt coil or coils; third, it reconnects the break or completes the shunt-circuit when the lamp or currents returns to its normal condition. This circuit-breaker consists of the swinging wire $w$, inserted loosely in the lever $l$ at $w'$. The wire $w$ is guided by the arm $l'$, which is part of the lever $l$. $w$ passes through a fork in the top of $l'$, which allows it to swing a certain angle, but limits its motion. At the upper end of $w$ is a roller $w^2$, made of bone or some insulating material, and so fixed that when the controlling-magnets of the lamp move the armature down to the extreme end of its stroke, which occurs only when the lamp fails to feed properly, the lever $l$ is swung up to the angle shown in Fig. 10, and causes the roller $w^2$ to snap past the end of the wire $v$ and wedge itself between the wire $v$ and spring $u$, thus separating them and breaking the electrical connection between them, which breaks the shunt-circuit. As soon as the magnets move from the lower end of their stroke, they begin to swing the lever $l$ toward a horizontal position, and before this movement progresses far enough to separate the carbons the roller $w^2$ is withdrawn from between the wire $v$ and the spring $u$, when they spring together and complete the shunt-circuit. By this means a snap-switch is formed actuated by the electro-magnets, enabling them to perform the following duties: first, to break the shunt-circuit; second, to cause the shunt-circuit to remain open; third, to close the shunt-circuit, as above described.

The last part of my invention relates to the means employed for producing a slow and even downward feed to the upper carbon.

Fig. 13 shows a mechanism which represents the idea employed for controlling the downward movement of the carbon-rod and the use made of the top tubes T for such purpose. I know that the top tubes of lamps have been used to retard the downward motion of the carbon-rod by having the rod provided with a plunger to fit the tube, and by using atmospheric resistance for preventing a too rapid descent of the rod; but the objections to the means heretofore employed are of two kinds: first, the liability of the plunger to stick in the tube, and, second, the fact that when the whole weight of the rod hangs on the plunger, after the rod has moved down part of the distance, there is so much air drawn in the tube back of the plunger that any weight placed upon the plunger rarefies such air and by its expansion allows too great a drop to take place before the inclosed air rarefies sufficiently to allow the atmospheric pressure to arrest its downward motion. My invention is to avoid these objections. Tube T is the top tube of the lamp provided with a screw-bushing $T^3$, soldered to the tube and threaded to fit in the bell F of the lamp-frame. (See Fig. 1.) Inside of this tube T is a plunger R', which is free to slide in T, but forming an air-tight joint between R' and T. R' has a stem $R^2$, which fits loosely in the carbon-rod R, so that if the rod would drop it would slide from around the stem $R^2$ and leave the plunger R' to slowly settle after it. To prevent this and use the slow motion of the plunger R', I provide the carbon-rod R with a head $R^3$, which bears against the tube on one side, and on the other is a pivot $R^5$, to which is hung a cam-lever $R^4$. This cam presses against the tube on the side opposite to where the head $R^3$ bears. Now the cam-lever reaches across the space in tube T and is pivoted to the plunger R' at $R^6$, so as the carbon-rod R drops it must drag the plunger after it; but in so doing it acts through the cam-lever $R^4$ and tilts it so as to make it bind against the tube T on one side, while the head $R^3$ binds on the other. So the friction of this binding arrests the movement of the carbon-rod without bringing a strain on the plunger, which would rarefy the air and draw the plunger down as it would if the rod was connected direct to the plunger, so its whole weight came directly on the plunger. Therefore I use the resistance of the atmosphere to retard the downward motion of the plunger and the slow motion of the plunger to work a clamping device which produces a friction between the rod R and tube T that arrests the downward motion of the rod R. As soon as the slow motion of the rod R is arrested by the controlling-magnets, the plunger R' settles and relieves the strain on the cam-lever $R^4$ against the tube T.

The objection to the use of a metallic or any solid form of plunger is its liability to stick and cause friction at the wrong time when made tight enough to obstruct the passage of the air. To prevent this I use the form of plungers shown in Figs. 14 and 15.

Fig. 14 shows a form in which T is the closed top tube, R the carbon-rod, and fixed in its upper end is a head 1. Upon the head 1 is an asbestus-paper disk H, cut larger than the inside diameter of the tube T, and on top of H is a mica disk 2, which fits the tube T just close enough to guide the rod R in and insulate it from the tube, but not close enough to stick or obstruct the passage of the air. On top of the mica 2 is a small metal washer 3, which does not touch the tube, and the screw 4, passing through 3, 2, and H into 1, screws them rigidly together, as shown. The paper disk H assumes an umbrella form, which closes as the rod is forced up and is opened as it moves down, and owing to its peculiar shape the pressure of the atmosphere forces its periphery, like a toggle-joint lever, against the sides of the tube T.

Fig. 15 shows the closed top tube T, with screw bushing $T^3$ screwed into the lamp-frame F and having fixed at its lower end a mica-guide and insulator N. On top of the mica N is an asbestus-paper washer $H^2$, which surrounds the rod R. This washer $H^2$ has a hole in it some smaller than the rod R, so that as the rod passes up through it the part surrounding the rod bulges up, but owing to the softness of the paper it does not bind or cause friction on the rod, but as the plunger R' descends it compresses the air between the plunger and $H^2$, causing the bulged part to spring in and hug the rod R and also make an air-tight joint around it, so as the plunger descends toward the end of its stroke the decreased volume of air in the lower part of the tube will offer an increased resistance, owing to its greater solidity, as the greater volume of air above the plunger loses its resistance by reason of its expansibility, and in that way the drop of the rod R is equally opposed at all points of its travel. When the rod has a lower guide $H^2$, I provide its plunger R' with a sliding joint $R^2$, which enables the rod to have side play in the tube T while the plunger R' remains in the center.

Fig. 16 shows a detail of the sliding joint $R^2$, (shown in Fig. 15,) in which R' is a plan of the head, provided with grooved clips $R^2$, between which a flat square plate $i$ slides. The rod R is provided with a head $R^3$, which has grooved clips which enable it to be slid on plate $i$ at right angle to the clips $R^2$ of head R', so as each part slides at right angle to the other the head R can remain in the center of the tube T when the rod R is slightly on one side.

What I claim as my invention is—

1. An electric-arc-lamp frame consisting of a cup-shaped top F, which will cover and partially surround the regulating mechanism, said top F having on its sides sockets F' for receiving the insulating-arms $F^5$, which project from F and surround part of the arms $F^5$, also side bars $F^3$, which are extensions from the sockets F', and unite at their lower end in forming the base $F^4$, substantially as and for the purposes set forth.

2. In an electric-arc-lamp frame, the insulating-cement B, into which the terminal plate A is embedded, said cement having an annular recess around the carbon-rod R and supported in its place by adhering to the inner surface of the lamp-top F, substantially as and for the purposes set forth.

3. In an electric-arc lamp, the insulating-cement B, secured in its place by adhering to the inner surface of the cup-shaped top of the lamp-frame, said cement having embedded into it the terminal plate A and forming a central recess through which the carbon-rod can pass, and an annular wall which abuts upon the bead F⁶, and forms an insulating-case between part of the regulating mechanism and the inner surface of the lamp-frame, substantially as and for the purposes set forth.

4. In an electric-arc lamp, the combination of the lower part of a lamp-frame, having an annular recess with a terminal shell $P^2$, consisting of a disk-shaped top adapted for receiving a lower-carbon holder, the under surface of which is provided with an annular bead extending downward from its periphery, and the binding cement $B^3$, which will form a hub extending above the base of the lamp-frame to the under surface of the disk-shaped top of $P^2$, substantially as and for the purposes set forth.

5. In combination with an electric-arc-lamp frame having a cup-shaped top with sockets projecting from its sides for covering and receiving the insulators of the lamp terminals and side bars which unite at their lower ends in forming the base of the lamp-frame, a shield for inclosing that part of the regulating mechanism of the lamp which projects from the cup-shaped top of the lamp-frame, said shield being provided with an internal insulating-ring at its lower end which will form a closed joint between the shield and the mechanism and having its upper end made so as to fit inside of the cup-shaped top of the lamp-frame, substantially as and for the purposes set forth.

6. An electric-arc lamp having a globe-holder formed semi-spherical, with a central shell for fitting around the tail tube or rod of a lamp-frame, ribs $e^3$ for the globe to rest on, bolt $e$, provided with bearings in the globe-holder, and spring $e^2$ for sliding the bolt in, a hooked end $e'$, made to cam on the outside of the globe-holder for drawing the bolt out, and a recess in the globe-holder for holding the chain $G^3$, substantially as and for the purposes set forth.

7. In an electric-arc lamp, a cage or frame containing the regulating mechanism and electro-magnets, in which are provided supports or bearings for the mechanical parts, and floors or positions for the electro-magnets, which magnets, when in place, are secured by tubes which are slid through the cage and the magnet-coils, thereby securing the coils in position and providing guides for the movable armature in the coils, substantially as and for the purposes set forth.

8. In an electric-arc lamp, a cage or frame K, consisting of top 1, bottom 2, side bars 3 and 4, and floors 5 and 6, with holes bored in a straight line through the top and the upper floor and the bottom and the lower floor, through which tubes $d$ are pressed, which extend through the frame, and coil or coils placed between the top 1 and floor 5 and through the bottom 2 and floor 6, and coil or coils placed between the bottom 2 and floor 6, substantially as and for the purposes set forth.

9. In an electric-arc lamp, the cage or frame K, provided with extensions for the contact-piece $a$ and lower bearings $g$ $g$, also having connected thereto the dash-pot D and insulating-block I, said cage holding the armature-rods $c$ and $c'$ confined in tubes $d$, which hold the magnet-coils in place, while the armature-yoke $c^2$ has room to work between the magnet-floors 5 and 6, together with the carbon rod R, substantially as and for the purposes set forth.

10. In an electric-arc lamp, a contact-piece connected to the lamp, provided with hooks or eyes at each end for receiving holding-screws, said piece being provided with semicircular yoke at its center and contact-brushes for surrounding the carbon-rod, substantially as and for the purposes set forth.

11. An automatic circuit-controller consisting of a snap-switch forming a path for the high-resistance shunt-circuit, said switch being operated by the extreme movement of the regulating-armature, closing it under the action of the main-circuit magnets and opening it under the action of the shunt-circuit magnets.

12. In an electric-arc lamp, an automatic shunt-circuit breaker consisting of the swinging wire $w$ and roller $w^2$, actuated by the working armature through the lever $l$, and the spring $v$ and wire $u$, which form part of the shunt-circuit, substantially as and for the purposes set forth.

13. In an electric-arc lamp, the combination, with the closed top tube, of a lamp with a carbon-rod having a loose plunger connected to its end by means of a lever adapted for converting the strain between the carbon-rod and the plunger into a pressure or friction between said carbon-rod and the inner surface of said tube, substantially as and for the purposes set forth.

14. In an electric-arc lamp, the combination, with the closed top tube T and carbon-rod R, of a head $R^3$, firmly connected to the carbon-rod R, a plunger R', provided with a stem $R^2$, which loosely fits in the carbon-rod, said plunger R' being connected to the carbon-rod R and head $R^3$ by means of the cam-lever $R^4$, substantially as and for the purposes set forth.

15. In an electric-arc lamp, the combination of a closed top tube T and carbon-rod R, provided with a head adapted for guiding the top end of the rod R in the center of the tube T and insulating the two from each other, said head being composed of a shank for screwing it to the carbon-rod, a series of mica disks formed so as to fit the tube T, and a flexible asbestus packing clamped between the mica disk and the head which is screwed to the rod R, the mica disks and asbestus packing, and the head being held together by a screw passing through the said disk and packing, substantially as and for the purposes set forth.

16. In an electric-arc lamp, a plunger connected to the carbon-rod R and made to fit in the top tube T, said plunger being formed of the head 1, flexible umbrella-shaped asbestus packing H, mica or insulating disk, and guide 2, washer 3, and screw 4, substantially as and for the purposes set forth.

17. In an electric-arc lamp, the carbon-rod provided with a plunger made to fit a closed top lamp-tube T, having a packing in the bottom of said tube, which forms an air-tight joint around said carbon-rod, constructed substantially as and for the purposes set forth.

18. In an electric-arc lamp, a plunger R', connected to the carbon-rod R by means of a sliding joint R², substantially as and for the purposes set forth.

19. An electro-magnet composed of a coil-conductor upon an insulating-spool placed between two floors, which are rigidly connected together, but far enough apart to receive the said spool, said floors being provided with holes which will correspond with the opening through the center of said spool, in combination with a tube to be slid through said floors and spool, adapted for keeping the spool in place and also for receiving an iron magnet core or armature, substantially as set forth.

ADDISON G. WATERHOUSE.

Witnesses:
JOHN H. GRAHAM,
JAMES P. POLAND.